(12) United States Patent
Hageman et al.

(10) Patent No.: US 11,417,008 B2
(45) Date of Patent: *Aug. 16, 2022

(54) ESTIMATING A VOLUME OF CONTENTS IN A CONTAINER OF A WORK VEHICLE

(71) Applicants: Deere & Company, Moline, IL (US); Carnegie Mellon University, Pittsburgh, PA (US)

(72) Inventors: John Hageman, Dubuque, IA (US); Tarik Loukili, Johnston, IA (US); Michael Kean, Maquoketa, IA (US); Herman Herman, Gibsonia, PA (US); Halit Bener Suay, Pittsburgh, PA (US)

(73) Assignees: Deere & Company, Moline, IL (US); Carnegie Mellon University, Pittsburgh, PA (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/917,214

(22) Filed: Jun. 30, 2020

(65) Prior Publication Data

US 2020/0334846 A1 Oct. 22, 2020

Related U.S. Application Data

(63) Continuation of application No. 15/657,552, filed on Jul. 24, 2017, now Pat. No. 10,733,752.

(51) Int. Cl.
*G06T 7/62* (2017.01)
*G01B 11/00* (2006.01)
(Continued)

(52) U.S. Cl.
CPC .................. *G06T 7/62* (2017.01); *E02F 9/26* (2013.01); *G01B 11/00* (2013.01); *G01B 11/24* (2013.01);
(Continued)

(58) Field of Classification Search
CPC ............ G06T 7/62; G06T 2207/10016; G06T 2207/10028; G06T 2207/30252;
(Continued)

(56) References Cited

U.S. PATENT DOCUMENTS 6,336,068 B1 * 1/2002 Lawson ................ E02F 3/6436
701/23
7,832,126 B2 11/2010 Koellner et al.
(Continued)

FOREIGN PATENT DOCUMENTS

WO 2016159839 10/2016
WO 2016170665 10/2016

OTHER PUBLICATIONS

Alex Bewley, Rajiv Shekhar, Ben Upcroft and Paul Lever, "Development of a Dragline In-Bucket Bulk Density Monitor", Australian Mining Technology Conference : Decision Support—Embedding Process Capability in Mining Systems, Sep. 12-14, 2011, Noosa, Gueensland Australia (Year: 2011).*

(Continued)

*Primary Examiner* — Ayman A Abaza
(74) *Attorney, Agent, or Firm* — Kilpatrick Townsend & Stockton LLP

(57) ABSTRACT

A volume of contents in a container of a work vehicle can be estimated in various examples. One example involves a system with a 3D sensor on a work vehicle, where the sensor captures images of a material in a container of the work vehicle. A processor device that is in communication with the 3D sensor determines a volume of the material in the container using the images.

17 Claims, 10 Drawing Sheets

(51) Int. Cl.
*H04N 13/207* (2018.01)
*H04N 13/246* (2018.01)
*H04N 13/271* (2018.01)
*E02F 9/26* (2006.01)
*G01B 11/24* (2006.01)
*G01B 11/26* (2006.01)
*G01F 22/00* (2006.01)
*E02F 3/40* (2006.01)

(52) U.S. Cl.
CPC .............. *G01B 11/26* (2013.01); *G01F 22/00* (2013.01); *H04N 13/207* (2018.05); *H04N 13/246* (2018.05); *H04N 13/271* (2018.05); *E02F 3/40* (2013.01); *E02F 9/261* (2013.01); *G06T 2207/10016* (2013.01); *G06T 2207/10028* (2013.01); *G06T 2207/30252* (2013.01)

(58) Field of Classification Search
CPC .. H04N 13/207; H04N 13/246; H04N 13/271; E02F 9/26; E02F 3/40; E02F 9/261; G01B 11/00; G01B 11/24; G01B 11/26; G01F 22/00
USPC .......................................................... 348/46
See application file for complete search history.

(56) References Cited

U.S. PATENT DOCUMENTS

| | | | |
|---|---|---|---|
| 8,170,756 B2 | 5/2012 | Morey et al. | |
| 8,229,631 B2 | 7/2012 | Morey et al. | |
| 2008/0005938 A1 | 1/2008 | Aebischer et al. | |
| 2009/0043460 A1* | 2/2009 | Morey | E02F 9/26 701/50 |
| 2010/0245542 A1 | 9/2010 | Kim et al. | |
| 2012/0136542 A1* | 5/2012 | Upcroft | E02F 3/48 701/50 |
| 2013/0329012 A1 | 12/2013 | Bartos et al. | |
| 2013/0346127 A1 | 12/2013 | Jensen | |
| 2015/0376868 A1* | 12/2015 | Jackson | E02F 9/2029 701/50 |
| 2018/0120098 A1 | 5/2018 | Matsuo et al. | |
| 2018/0239849 A1* | 8/2018 | Martinsson | G06K 9/00214 |

OTHER PUBLICATIONS

Alex Bewley, Rajiv Shekhar, Sam Leonard, Ben Upcroft, and Paul Lever, "Real-Time Volume Estimation of a Dragline Payload", IEEE International Conference on Robotics and Automation Shanghai International Conference Center, May 9-13, 2011, Shanghai, China (Year: 2011).*
U.S. Appl. No. 15/657,552 , "Advisory Action", dated Feb. 28, 2020, 5 pages.
U.S. Appl. No. 15/657,552 , "Advisory Action", dated May 20, 2019, 5 pages.
U.S. Appl. No. 15/657,552 , "Final Office Action", dated Mar. 28, 2019, 13 pages.
U.S. Appl. No. 15/657,552 , "Final Office Action", dated Dec. 20, 2019, 19 pages.
U.S. Appl. No. 15/657,552 , "Non Final Office Action", dated Oct. 9, 2018, 18 pages.
U.S. Appl. No. 15/657,552 , "Non-Final Office Action", dated Aug. 23, 2019, 17 pages.
U.S. Appl. No. 15/657,552 , "Notice of Allowance", dated Apr. 1, 2020, 9 pages.
U.S. Appl. No. 15/657,552 , "Restriction Requirement", dated Aug. 3, 2018, 5 Pages.
Bewley et al., "Development of a Dragline In-Bucket Bulk Density Monitor", In 2011 Australian Mining Technology Conference: Decision Support—Embedding Process Capability in Mining Systems, Sep. 2011, pp. 1-10.
Bewley et al., "Real-Time Volume Estimation of a Dragline Payload", IEEE International Conference on Robotics and Automation Shanghai International Conference Center, 2011, pp. 1571-1576.
Search Report Issued in German Application No. 10 2017 218 770.0 dated Aug. 31, 2018, 12 pages.
"ShovelMetrics—Optimize shovel productivity and minimize downtime", http://www.motionmetrics.com/shovels/ (Jul. 7, 2017).
"X2650 Excavator Scales", http://loadritescales.com/product/x2650=excavator-scales (Jul. 7, 2017).

* cited by examiner

ESTIMATING A VOLUME OF CONTENTS IN A CONTAINER OF A WORK VEHICLE

CROSS REFERENCES

This application is a continuation of and claims priority to U.S. application Ser. No. 15/657,552, filed Jul. 24, 2017 and entitled "Estimating a Volume of Contents in a Container of a Work Vehicle," the entirety of which is incorporated by reference herein.

TECHNICAL FIELD

The present disclosure relates generally to devices for use in earth-moving operations. More specifically, but not by way of limitation, this disclosure relates to estimating the volume of contents in a container of a work vehicle.

BACKGROUND

Operating a work vehicle, such as an excavator or a scraper, is a highly personal skill. Efficiency—e.g., amount of earth moved by the work vehicle over an amount of time—is one way to measure at least part of that skill. And efficiency is also one way to measure the performance of the particular machine. Measuring efficiency with accuracy and without interjecting an additional step on moving the earth is difficult. Weighing contents of the bucket of an executor interjects additional steps that may cause the overall earth-moving process to be less efficient. Processes used to determine the amount of contents in the bucket without physical contact with the bucket may not accurately estimate the volume of the contents.

SUMMARY

In one example, a system includes a 3D sensor on a work vehicle. The 3D sensor can be configured to capture a plurality of images of contents in a container of the work vehicle. The system can also include a sensor configured to detect an angle of the container with respect to the 3D sensor for at least some images of the plurality of images. The system can include a processor device in communication with the 3D sensor and the sensor. And the system can include a memory device in which instructions executable by the processor device are stored for causing the processor device to determine a volume of the contents in the container using the plurality of images and the angle.

In another example, a method can include receiving, from a 3D sensor, a plurality of images of contents in a container of a work vehicle. The method can also include detecting, using a sensor, an angle of the container with respect to the 3D sensor for at least some images of the plurality of images. The method can also include determining a volume of the contents in the container using the plurality of images and the angle. Some or all of the steps of the method can be performed by a processor device.

In another example, a work vehicle can include a 3D sensor configured to capture a plurality of images of contents in a container of the work vehicle. The work vehicle can also include a sensor configured to detect an angle of the container with respect to the 3D sensor for at least some images of the plurality of images. The system can include a processor device in communication with the 3D sensor and the sensor. And the work vehicle can include a memory device in which instructions executable by the processor device are stored for causing the processor device to determine a volume of the contents in the container using the plurality of images and the angle.

DETAILED DESCRIPTION

Figure 1:
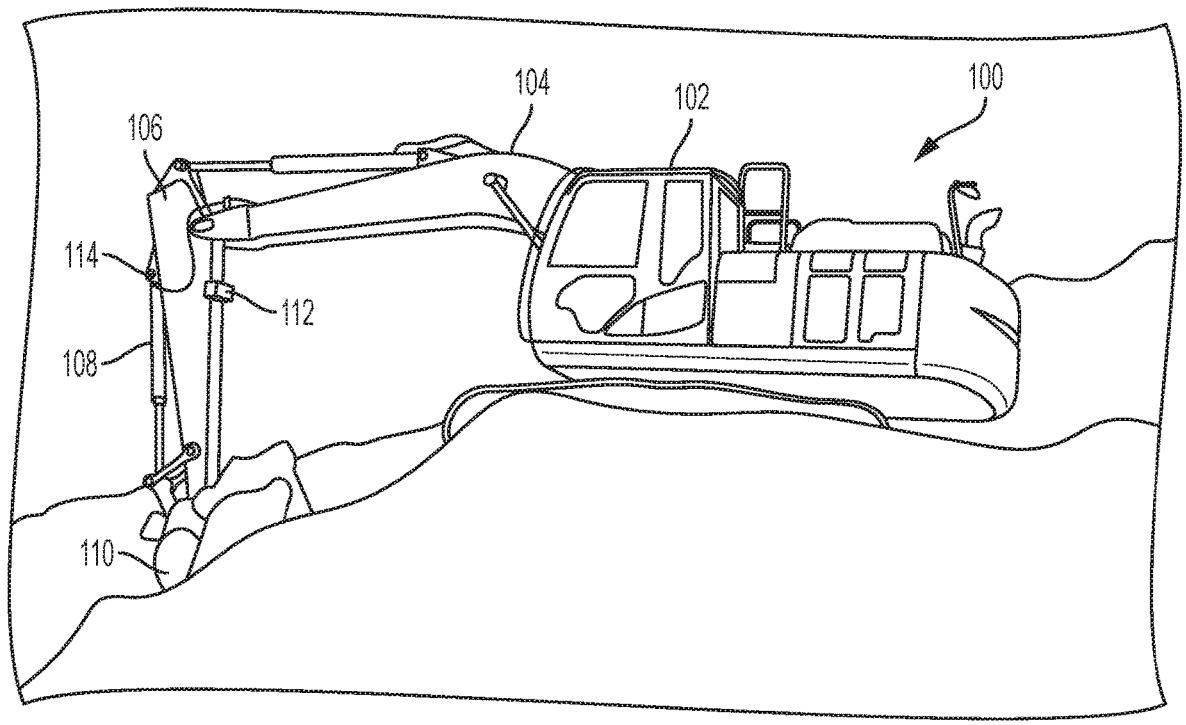
FIG. 1 is a perspective view of a work vehicle that is an excavator with a volume estimation system according to one aspect of the present disclosure.

Certain aspects and features of the present disclosure relate to estimating a volume of earth in a container of a work vehicle, such as an excavator, front loader, a scraper, below-ground mining equipment, or other type of machine, using a non-contact measurement system. The system can include a 3D sensor, such as a stereo camera (which may be referred to as a stereoscopic camera) or a laser scanner, and an angle sensor. The 3D sensor can capture images of the contents of the container. The images can be converted to a 3D point cloud using angles measured from the angle sensor. The 3D point cloud can be compared to a known point cloud, mathematical model, or CAD model representing the container and different volumes of contents to determine the volume of content in the container. Additionally or alternatively, the angle data from the angle sensor can be used for camera and container alignment.

Using certain aspects, the productivity of material moved by a work vehicle or a group of work vehicles at a work site can be monitored. Visual sensors, such as 3D sensors or laser sensors, can be used to improve volume estimation accuracy and ease. Costs and inconvenience can be reduced, as compared to other volume estimation solutions, such as position sensors and weighting sensors.

In one example, a volume estimation system includes a stereo camera mounted to the arm of an excavator that has a bucket that is within the field of view of the stereo camera. Another sensor, such as a cylinder position sensor or an inertial measurement unit (IMU) sensor, can be used to determine the angle of the bucket relative to the arm. The system can create a model of the bucket and understand how the bucket rotates with respect to the arm. The stereo camera can be used to create a 3D point cloud of objects in the field of view of the stereo camera. The system can determine which surface is above the bucket that is likely to be soil. The surface of the soil can be compared to the model of the bucket and its rotation angle to determine the amount of material in the bucket and produce a volume estimation measurement substantially contemporaneously with the bucket moving the soil. Other logic can determine whether there are individual scoops of material and the system can attempt to use as many relevant measurements during the dig cycle to produce the most accurate volume measurement per scoop as possible. The data, along with other metrics, can be displayed to the excavator operator or streamed to a cloud service, such as JDLink™, for an owner or manager to view.

The volume of a material can be estimated using various processes. One process can include measuring 3D points that represent the surface of material carried by the container of a work vehicle using a sensor that does not contact the container or the material in the container. In some examples, the surface of the material can be extrapolated when the material is unobservable by the non-contact sensor by measuring an angle of repose of the material. The 3D points may also include other surfaces both within the carrier and the surrounding environment that is within the field of view of the sensor. The position and orientation of the container relative to the sensor can be measured. The 3D points that correspond to the material carried by the container can be determined and the 3D points that correspond to the container itself can be determined. The 3D points that do not correspond to material carried by the container or the container itself can be filtered out. For example, 3D points representing dust or other airborne obscurers can be filtered out. The volume of material can calculated using the 3D points corresponding to the material carried by the carrier using (i) the orientation or location of the carrier relative to the sensor and (ii) a 3D shape of the carrier. For example, the volume can be calculated as a difference from a reference surface that represents a known volume.

A system according to some examples can include additional features. For example, visual tracking can be used to identify swing state and other motion of the work vehicle. The surfaces of both the material within the container and the surrounding material surfaces in the environment can be determined and compared. Other sensor inputs, such as position, speed, and pressure, from sensors on the work vehicle can also be used.

The sensor can be a stereo camera mounted on a stick, boom, or chassis of an excavator. The stereo camera can stereoscopically capture the 3D points. In other examples, the sensor can be a different type of sensor (e.g., a fixed, scanning, or flash laser mounted on the work vehicle) that can use time-of-flight principles to capture the 3D points.

The system can differentiate between the material carried by the container and other material or objects using the appearance (such as from color data) and the location of the 3D points. Filtering out non-container and non-carried material can use both a depth image of the field of view and the appearance of the images captured by the stereo camera. The geometry of the shape of the container can be modeled. One process to model the shape of the carrier includes measuring by the sensor the 3D points that correspond to the container when the container is empty—i.e., there is no material in the container—such as through a calibration process. The 3D points are filtered to determine the boundaries of the container. A mathematical representation of the container is generated by processing the measured 3D points. Segments of the 3D points corresponding to various geometric components of the container are generated. Examples of segments include a back plate, side sheets, an inner surface and teeth, for a container that is a bucket. The model can also be generated using a 3D CAD drawing of the container. Each the geometric components of the container can be determined by the appearance and relative position and orientation with reference to the sensor, of the respective geometric component. The geometry of the shape of the container can be modeled from an onboard or off-board storage device.

In some examples, a plane (e.g., a strike plane) that corresponds to the top surface of the container can be defined and updated as the container moves. A closed boundary representing the perimeter of the container can be defined in the plane and updated as the container moves. The volume within the closed boundary that is on the plane and the measured 3D points can be calculated. The closed boundary on the plane can be defined by an operator using one or more images of the container. A planar grid that includes cells of known surface area within the closed boundary on the plane can be defined. The 3D points can be projected onto the grid to increase computational efficiency. The distance between a 3D point corresponding to the material in the container and a 3D point corresponding to the mathematical model of an inner surface of the implement can be measured. The distances that fall within the defined boundary of the container can be summed. The sum of the distances can be multiplied by the area represented by each cell on the grid.

Accuracy and stability of a volume measurement of material carried in a container can be further increased. For example, the consistency of multiple consecutive measurements can be computed. The moving average of volume estimations can be computed. A filter can be applied to instantaneous volume measurements. The model of the container can be updated using a rotation angle measured by an encoder that is combined with measurements from the stereo camera or when the container is occluded from the stereo camera.

In some examples, the performance of the work vehicle operator can be measured by recording the total volume of the material moved throughout the operation and generating a histogram of the measured volume of the material. In addition or alternatively, volume estimation metrics and visualizations can be displayed as one or more of (i) a 3D point cloud of the container, material, and the surrounding environment, (ii) images from the stereo camera, or (iii) metrics, such as volume estimation, variance, totals, container position, container velocity, etc.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a perspective view of a work vehicle that is an excavator 100 with a volume estimation system according to one aspect of the present disclosure. The excavator 100 includes a cab 102, a boom 104, a stick 106, a hydraulic cylinder 108, and a bucket 110 or other type of container, among other components. The bucket 110 can be used to move earth or other items from one location to another and can be rotationally controlled by the hydraulic cylinder 108 and positionally controlled by the boom 104 and stick 106. The cab 102 can house an operator and includes controls for controlling the other components of the excavator 100.

The volume estimation system can include a 3D sensor, such as a stereo camera 112, a computing device (not shown), and an angle sensor 114. The stereo camera 112 is positioned on the stick 106 in FIG. 1, but in other examples, the stereo camera 112 can be positioned on other components of the excavator 100, such as the boom 104. The stereo camera 112 can be positioned as far up the stick 106 as possible to increase the field of view of the stereo camera 112 to as wide an angle as possible. The angle sensor 114 can be positioned on or near the hydraulic cylinder 108.

The stereo camera 112 can capture images of the bucket 110 for continuously monitoring the volume of material in the bucket 110. The images can be used with information from the angle sensor 114 and knowledge about the size of the bucket 110 to determine a volume of the contents in the bucket at any particular time. For example, the computing device (not shown) can be positioned in any suitable location within the excavator 100, such as within the cab 102, or remotely from the excavator 100. The computing device can receive the signals from the stereo camera 112 and the angle sensor 114, and determine the volume of the contents of the bucket 110 as the contents, such as earth, is moved from one location to another. The signals can include multiple images of the bucket 110 and one or more angles associated with the images. The computing device can use data represented by the signals to determine the volume of the contents in the bucket. The volume of the contents can be used to monitor or measure an efficiency of the operator of the excavator 100, or of the excavator 100 itself. In some examples, a display device is mounted in the cab 102 or in a remote location to display data about the volume of contents in the bucket 110.

Figure 2:
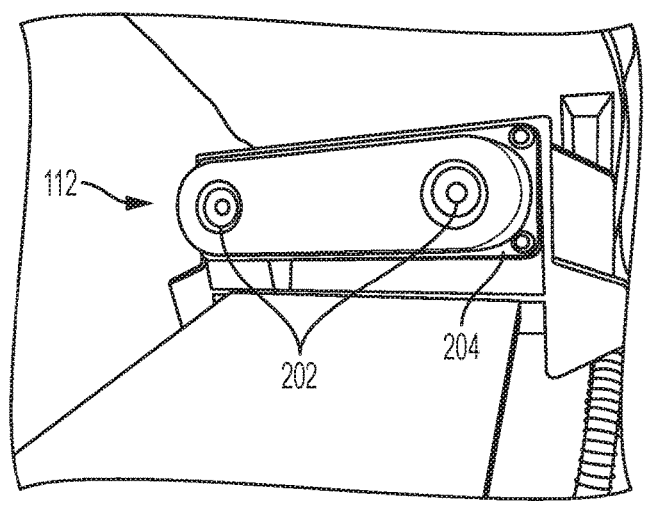
FIG. 2 is a perspective view of the stereo camera from FIG. 1 according to one aspect of the present disclosure.

FIG. 2 is a perspective view of the stereo camera 112 from FIG. 1 according to one aspect of the present disclosure. The stereo camera 112 includes two lenses 202 that are separate image sensors spaced apart from each other and have a known spatial relationship with respect to one another. The arrangement can simulate binocular vision to capture 3D images. The lenses 202 are mounted in a housing 204 that can include one or more mounting devices (e.g., holes, clips, or clamps) for mounting the stereo camera 112 to the excavator of FIG. 1. The housing 204 can include holes positioned in front of the lenses 202 such that the housing 204 does not block the field of view of the lenses 202.

The stereo camera 112 can be mounted above the bucket 110 in FIG. 1 and oriented facing the bucket 110. This can allow the stereo camera 112 to detect material in the bucket 110, along with other objects within the field of view of the stereo camera 112. The stereo camera 112 can transmit signals representing captured images of the field of view of the stereo camera 112 to the computing device.

Figure 3:
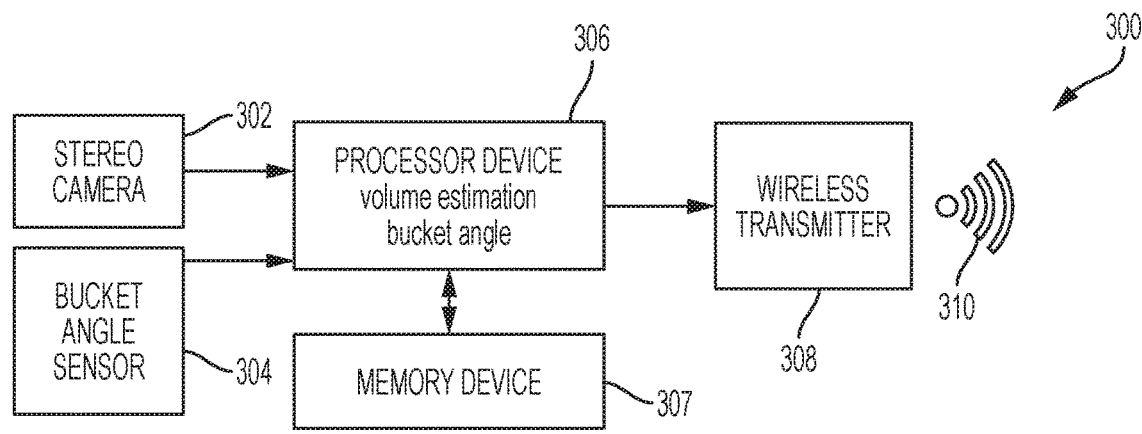
FIG. 3 is a block diagram of a volume estimation system according to one aspect of the present disclosure.

FIG. 3 is a block diagram of a volume estimation system 300 according to one aspect of the present disclosure. The volume estimation system 300 includes a stereo camera 302 and a bucket angle sensor 304. In other examples, the volume estimation system 300 includes any other type of 3D sensor, such as a 3D laser scanner, an ultrasonic transducer, a range sensor, a structured light camera, a 3D camera, or a flash LIDAR, additionally or alternatively to the stereo camera 302. The bucket angle sensor 304 can be any type of sensor that can provide a reference location of a bucket of a work vehicle relative to the stereo camera 302. An example of the bucket angle sensor 304 is an inertial measurement unit (IMU). The angle can alternatively be measured indirectly, such as by a hydraulic-cylinder-mounted sensor. That is, a sensor may measure the hydraulic cylinder position to determine the angle of the bucket, rather than measuring the angle of the bucket directly.

Also included in the volume estimation system 300 is a processor device 306 and a memory device 307 that can receive data from each of the stereo camera 302 and the bucket angle sensor 304. The processor device 306 can execute one or more operations stored in the memory device 307 for determining an angle of the bucket or other container at a given point in time and for estimating the volume of material in the bucket. The processor device 306 can include one processor device or multiple processor devices. Non-limiting examples of the processor device 306 include a Field-Programmable Gate Array ("FPGA"), an application-specific integrated circuit ("ASIC"), a microprocessor, etc.

The processor device 306 can be communicatively coupled to the memory device 307 via a bus. The non-volatile memory device 307 may include any type of memory device that retains stored information when powered off. Non-limiting examples of the memory device 307 include electrically erasable and programmable read-only memory ("EEPROM"), flash memory, or any other type of non-volatile memory. In some aspects, at least part of the memory device 307 can include a medium from which the processor device 306 can read the instructions. The memory device 307 can include any type of non-transitory computer-readable medium, such as electronic, optical, magnetic, or other storage devices capable of providing the processor device 306 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc. In some examples, the memory device 307 can include an image processing module (not shown). The processor device 306 can use the image processing module to perform one or more image processing tasks on data received from the stereo camera 302.

The volume estimation system 300 also includes a wireless transmitter 308 that can receive the estimated volume from the processor device and output a wireless signal 310 to another device, such as a display device or a database. The wireless transmitter 308 can represent one or more components that facilitate a network connection. Examples include, but are not limited to, wireless interfaces such as IEEE 802.11, Bluetooth, or radio interfaces for accessing cellular telephone networks (e.g., transceiver/antenna for accessing a CDMA, GSM, UMTS, or other mobile communications network). In other examples, the wireless transmitter 308 is replaced with a transmitter for transmitting the data via a wired connection to the other device.

Figure 4:
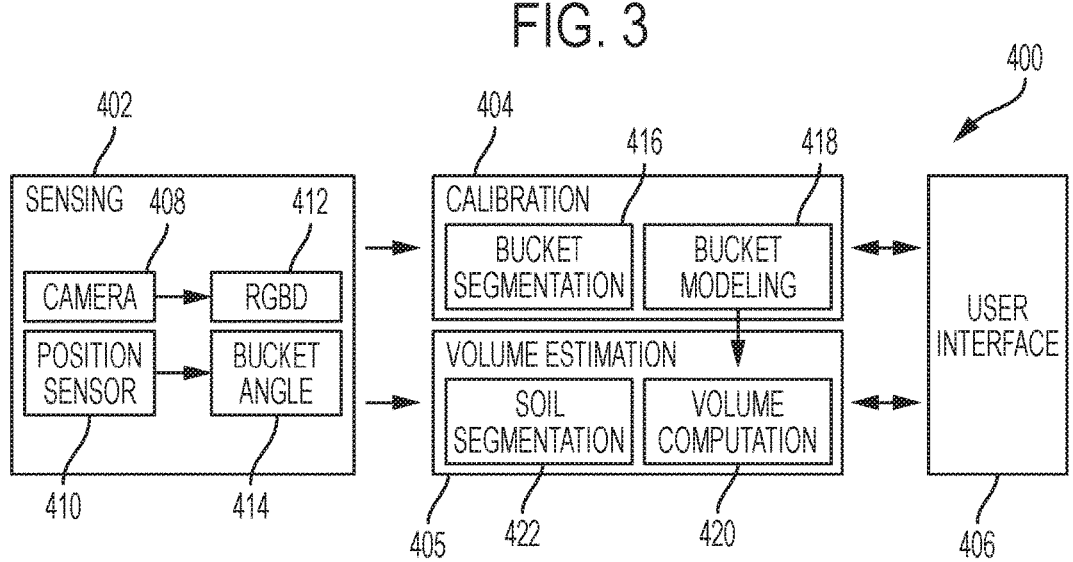
FIG. 4 is a functional block diagram of a volume estimation system according to one aspect of the present disclosure.

FIG. 4 is a functional block diagram of a volume estimation system 400 according to one aspect of the present disclosure. The volume estimation system 400 includes a sensing portion 402, a calibration portion 404, and a volume estimation portion 405, along with a user interface 406 for outputting data to a user or another system. In some examples, the calibration portion 404 and the volume estimation portion 405 can be implemented by a processor device, such as processor device 306 of FIG. 3.

The sensing portion 402 includes a camera 408 or other type of sensor for capturing 3D images and data of a bucket or other container of a work vehicle. The sensing portion 402 also includes a position sensor 410 that can be a bucket angle sensor or another type of sensor. The camera 408 can provide multiple images of the bucket or other container. The images can include color content, such as red, green, blue (RGB) content, and depth content (D). The position sensor 410 can provide a bucket angle 414 or angles of the bucket or other container. The bucket angle 414 and the image data, in color and with depth information, can be provided to the calibration portion 404 and the volume estimation portion 405. In some examples, the image data of the bucket without material in it can be provided only to the calibration portion 404, and image data acquired subsequently that includes images of the bucket with material in it can be provided only to the volume estimation portion 405.

The calibration portion 404 can generate a model of the bucket using the image data and the angle data. The model can be in the form of a 3D point cloud that represents the components of the bucket, and may have information about volumes if material were at different levels in the bucket. The calibration portion 404 includes a bucket segmentation module 416 that can segment the image data to determine the components of the bucket and the positions of the components relative to each other. For example, the bucket segmentation module 416 can analyze pixel data in the images to identify the back of the bucket, the front of the bucket, the sides of the bucket, and the teeth or other protrusions extending therefrom. That information can be provided to the bucket modeling module 418 that can generate the model of the bucket as a configuration file. The configuration file can have information about the bucket in a 3D point cloud arrangement. In general, the configuration file can store various parameters (e.g., bucket capacity, dimensions, mathematical model coefficients, etc.) regarding each component of the software. The configuration file can also be outputted via the user interface 406. More information about a calibration process according to some examples is described below with reference to FIGS. 12, 13, and 14.

The model can be used by a volume computation module 420 in the volume estimation portion 405 to estimate a volume of material in the bucket. Image data and bucket angle data of the bucket with material in it can be received by a soil segmentation module 422, which can determine whether material represented in the image data is in the bucket or if it is in the background or another part of the image.

Figure 18:
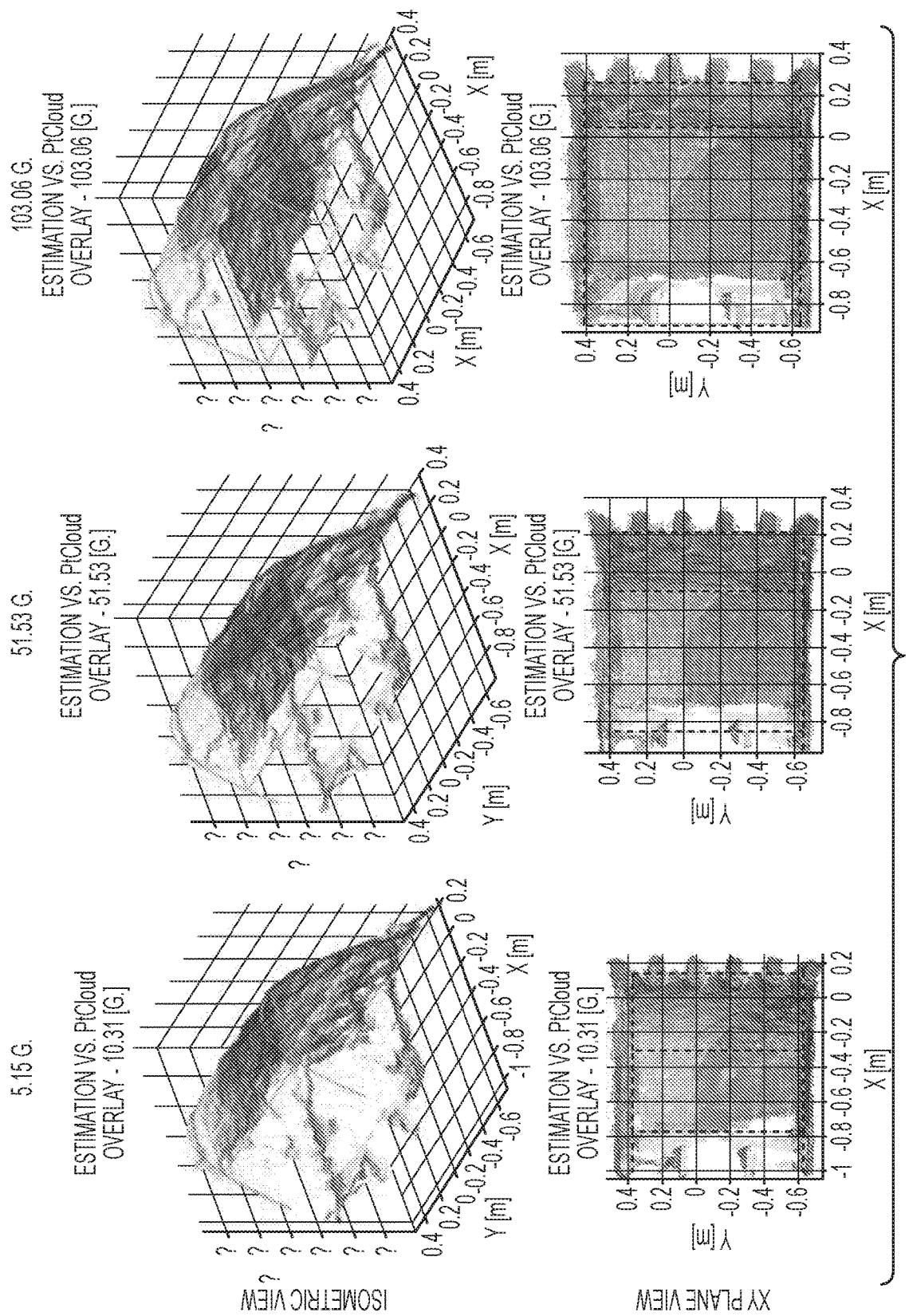
FIG. 18 includes isometric views and X/Y plane views of examples of point clouds of a container according to some aspects of the present disclosure.

Examples of the model of the bucket and its contents are shown in FIG. 18. The top row in FIG. 18 includes three isometric views of a 3D model of the bucket. The isometric views can represent material accumulating in bucket over time during a single scoop, or the different amounts of material corresponding to different scoops. In these examples, the volume computation module 420 has determined that the bucket includes 5.15 gallons of material, 51.53 gallons of material, and 103.06 gallons of material, respectively. The bottom row in FIG. 18 includes three X/Y plane views of a model of the bucket. The plane views can represent material accumulating in the bucket over time during a single scoop, or the different amounts of material corresponding to different scoops. In these examples, the volume computation module 420 has also determined that the bucket includes the 5.15 gallons of material, 51.53 gallons of material, and 103.06 gallons of material, respectively. Multiple different models and views of the bucket can be generated and presented to a user.

Figure 9:
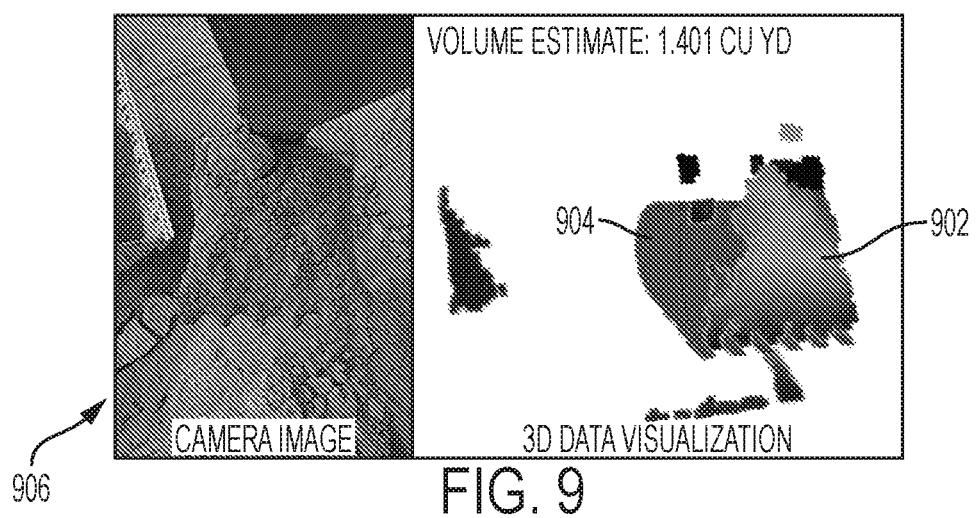
FIG. 9 depicts an example of a point cloud of material in a bucket as processed from a camera image obtained from a stereo camera according to some aspects of the present disclosure.
Figure 10:
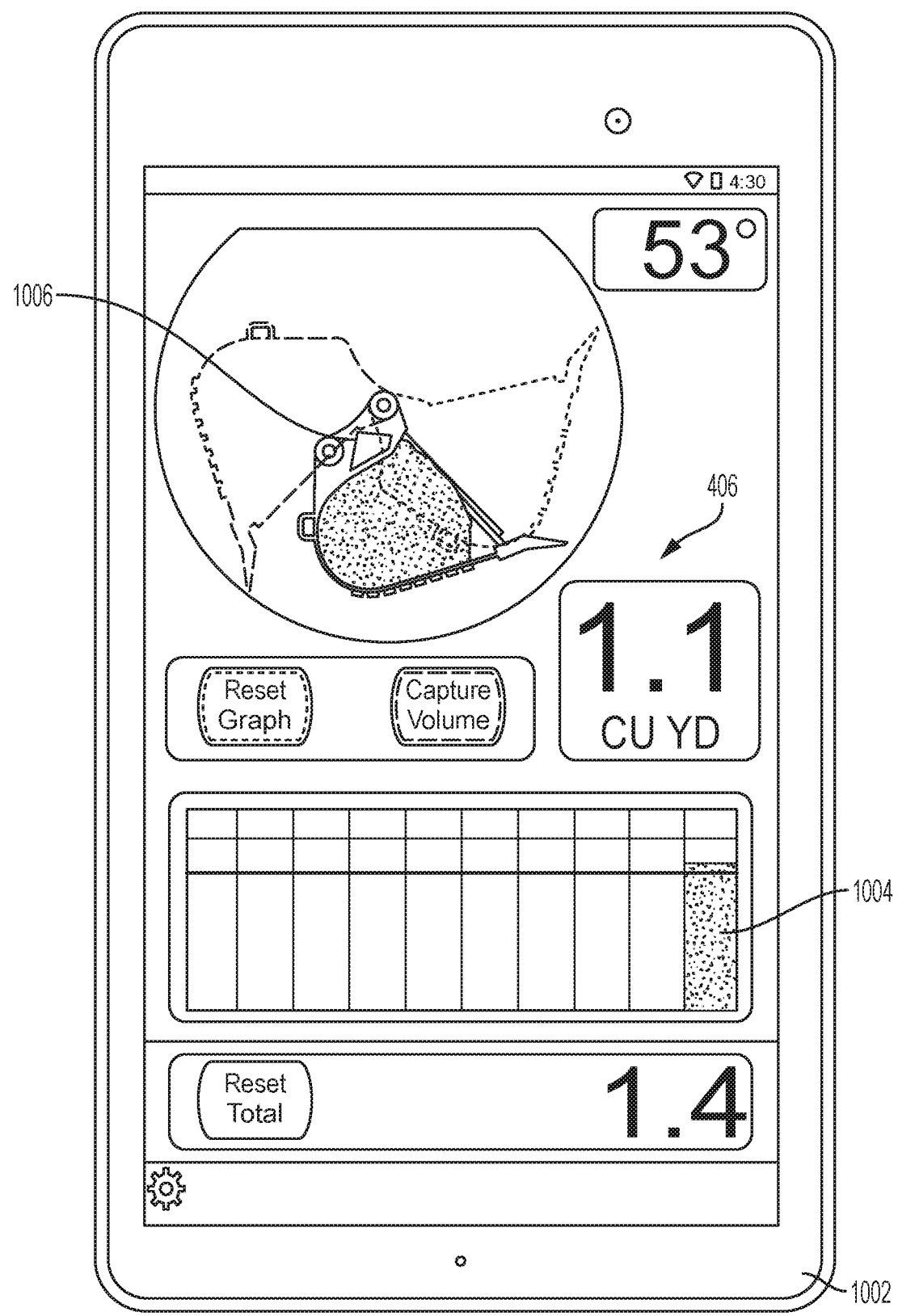
FIG. 10 depicts an example of the user interface on a display device according to some aspects of the present disclosure.

Returning to FIG. 4, the image data representing material in the bucket can be provided to the volume computation module 420, which can compare that image data to the configuration file to output an estimate of the volume of the material in the bucket. The estimate of the volume can be provided to the user interface 406, which may be a display device that can output a visual representation of the volume estimation. FIG. 9 depicts an example of a point cloud of material 902 in a bucket 904 as processed from a camera image 906 obtained from a stereo camera. FIG. 10 depicts an example of the user interface 406 on a display device 1002 according to some aspects of the present disclosure. The user interface 406 can include a bar chart 1004 depicting a history of volumes of material calculated from previous scoops and a three-dimensional representation 1006 of a point cloud or similar depiction of a current scoop.

Figure 5:
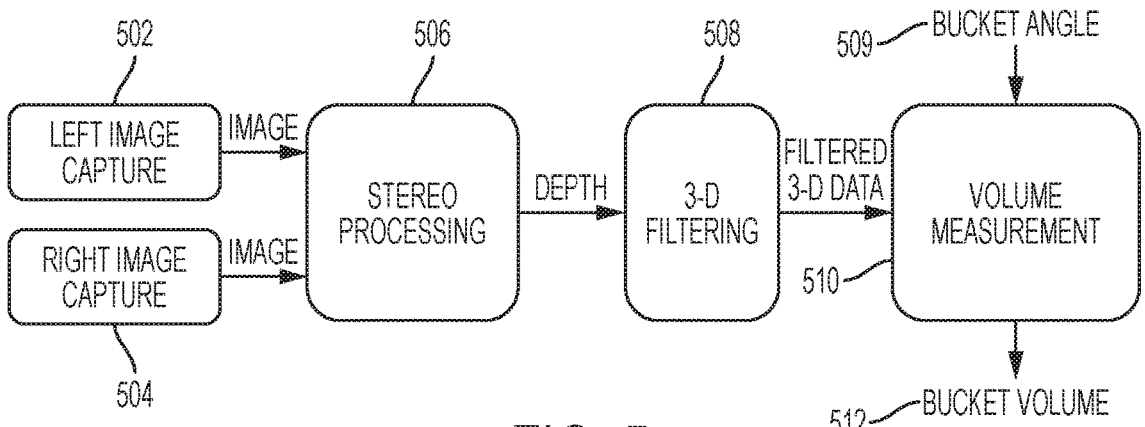
FIG. 5 is a process flow diagram for processing stereo images for measuring volume of material in a bucket according to one aspect of the present disclosure.

FIG. 5 is a process flow diagram for processing stereo images for measuring the volume of material in a bucket according to one aspect of the present disclosure. A stereo camera can capture left-eye images 502 and right-eye images 504 of a field of view that includes a bucket with material. A processor device performs stereo processing 506 on the captured images to determine depth information representing by the left-eye images 502 and the right-eye images 504. For example, the images may be time stamped and a left-eye image and a right-eye image sharing the same time stamp can be combined to determine the depth information represented by the images.

The images and the depth information are filtered using a 3D filtering process 508. For example, the filtering process 508 can remove speckles that are flying points or debris in the area, or other visual representations of objects that are not within the bucket. The filtering process 508 can include performing a speckle reduction process on the images. The filtered 3D data and a bucket angle 509 are used to determine a volume measurement 510 of the contents within the bucket. For example, the bucket angle 509 can be used to determine an expected surface area of material that is in the bucket. If the angle of the bucket with respect to a stick of an excavator is greater than ninety degrees, the expected surface area (e.g., a reference plane) from a view angle of the stereo camera may be less than if the angle of the bucket with respect to the stick is ninety degrees or around ninety degrees. The expected surface area of material can be used to analyze the actual surface area of the material in the bucket to determine a volume measurement. For example, relative transforms can be computed with respect to the expected surface area to determine if a point is earth. The volume 512 can be outputted to a display device or to a database for storage.

Figure 6:
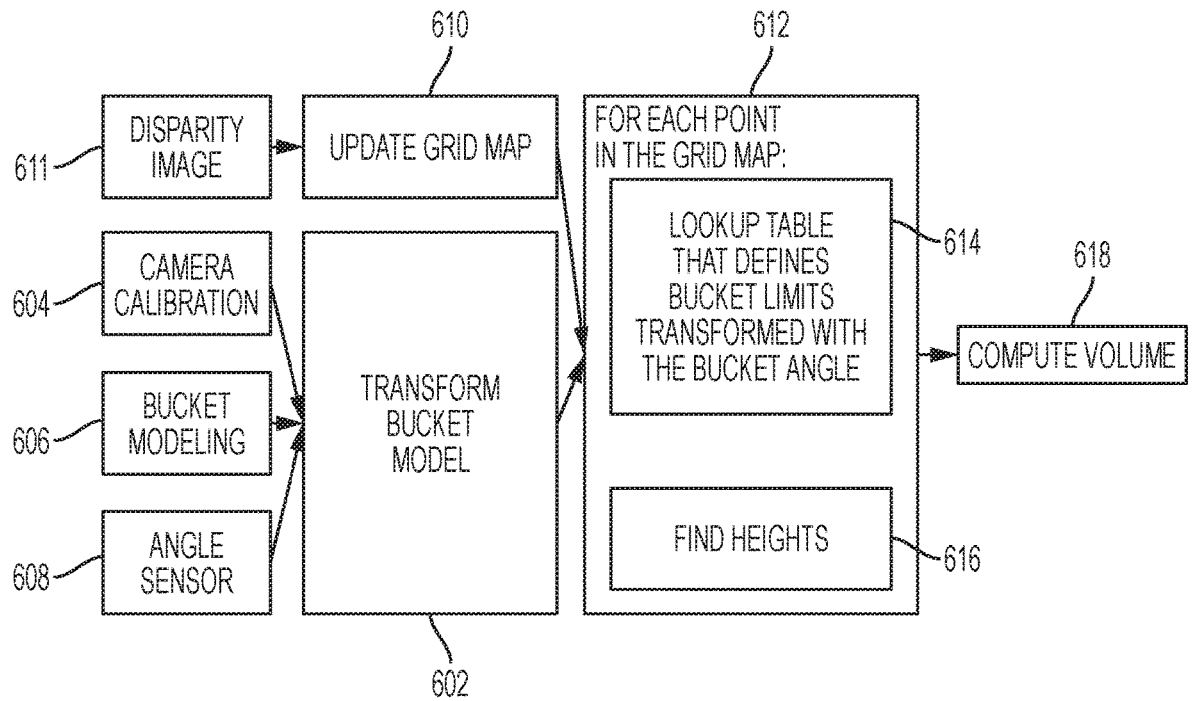
FIG. 6 is a flow diagram of a process for computing a volume of material in a container of a work vehicle according to one aspect of the present disclosure.

FIG. 6 is a flow diagram of a process for computing a volume of material in a container of a work vehicle according to one aspect of the present disclosure. Other examples can include more steps, fewer steps, or a different order of the steps shown in FIG. 6.

In block 602, a bucket model is transformed or generated using camera calibration information 604, an existing bucket model or template 606, and an angle from an angle sensor 608. The bucket model may be transformed or generated in a calibration stage, such as by using images of an empty bucket from the camera calibration information 604 to modify or transform an existing bucket model or template of a bucket model, in addition to the angle from the angle sensor 608 at which the images are acquired.

In block 610, a grid map of a 3D point cloud is updated using stereo or disparity images 611 captured by the camera of the bucket with material in it. The updated grid and the bucket model are provided to block 612 for further processing. The grid map can be updated with each new image frame that is captured by the camera.

For each point in the grid map, a look-up table is used that defines bucket limits, as transformed with the bucket angle, in block 614. The look-up table can be used, for example, in a segmenting process to identify the points from the grid map that are in the bucket, as opposed to points representing the bucket itself, background images, or speckle artifacts in the image data.

For each point in the grid map that is identified as a point that is in the bucket, the height associated with that point can be determined in block 616. In one example, the height for a point can be determined using the model of the bucket to determine depth information of a point positioned in a particular location in the bucket.

In block 618, the height information for the points can be used to compute the volume of the points within the bucket, and thus the volume of the material in the bucket. In one example, the volume for each point is determined, and then the volume for the points in the bucket are summed to compute the volume for the material in the bucket.

Figure 7:
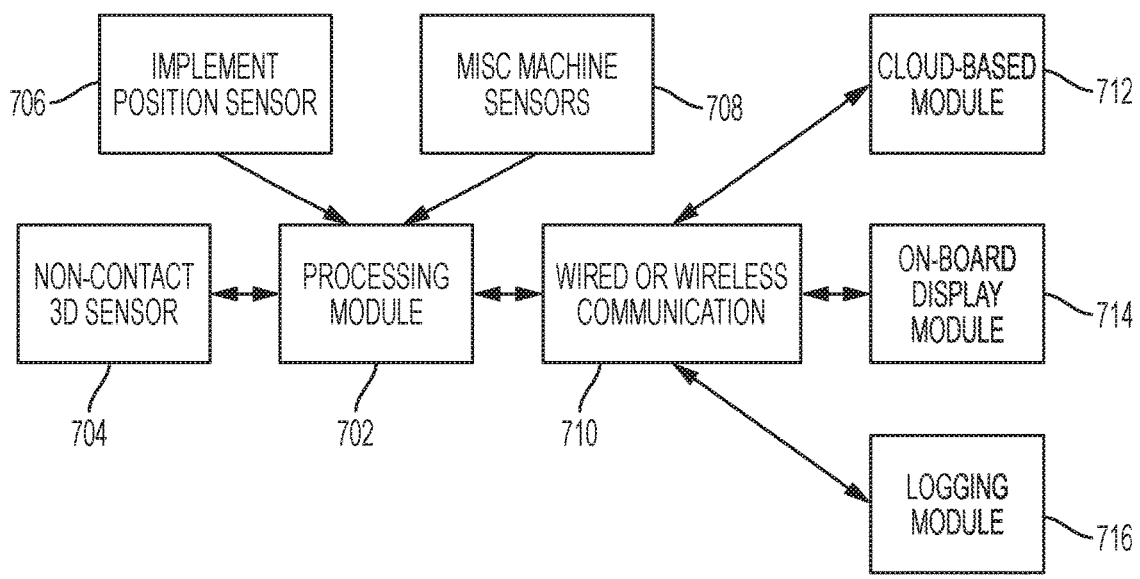
FIG. 7 is a block diagram of a hardware architecture of a volume estimation system according to one aspect of the present disclosure.

FIG. 7 is a block diagram of a hardware architecture of a volume estimation system according to one aspect of the present disclosure. The hardware architecture includes a processing module 702 to which other components are communicatively coupled through a controller area network (CAN) interface, an Ethernet interface, or another type of interface. The components can include a non-contact 3D sensor 704, which may be a stereo camera, and an implement position sensor 706, which may be an angle sensor. An example of an implement is a bucket or other container. Other miscellaneous machine sensors 708 can also be included. These may include GPS, speed sensors, moisture sensors, or other types of sensors. The processing module 702 can communicate data and control signals with each of the sensors 704, 706, 708. The processing module 702 can also process data, such as by determining a volume estimate of material in the implement, and transceive data with other components via a wired or wireless communication module 710. The other components can include a cloud-based module 712 for allowing the data to be accessible to other users or systems via a cloud storage facility, an on-board display module 714 for displaying the data to an operator of a work vehicle, and a logging module 716 for storing the data over time for subsequent access and comparison.

Figure 8:
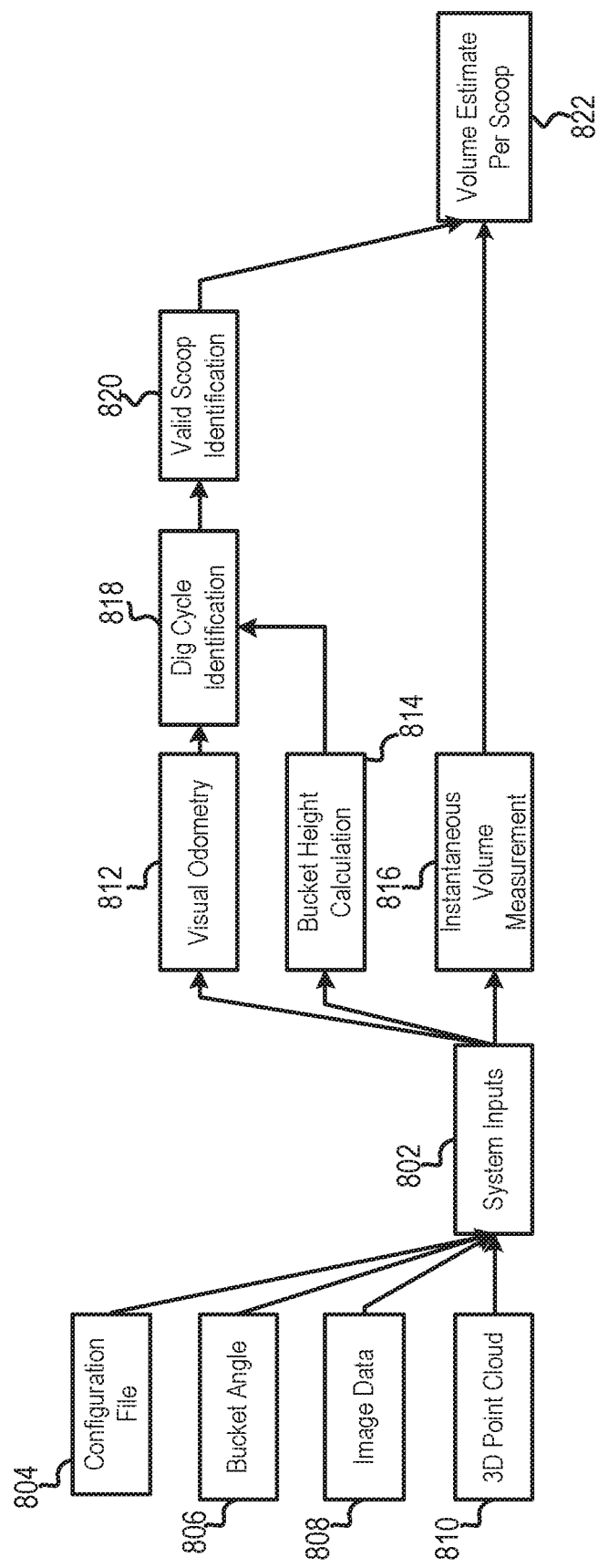
FIG. 8 is a software logic diagram for determining a volume of material in a container via a 3D sensor system according to some aspects of the present disclosure.

FIG. 8 is a software logic diagram for determining a volume of material in a container via a 3D sensor system according to some aspects of the present disclosure. The software logic modules can be implemented as instructions in modules stored on a non-transitory computer-readable medium and executed by a processor device.

The modules can include system inputs 802, such as a configuration file 804, bucket angle 806, image data 808, and a 3D point cloud 810. The configuration file 810 can include information about a particular container being used on the associated work vehicle. The information can include a minimum volume of the bucket, a maximum volume of the bucket, a minimum bucket angle, a maximum bucket angle, and a process for calculating scoop volume, among other possible data. The bucket angle 806 may be the angle of the bucket relative to a camera. The image data 808 can include images of the bucket from the camera. The 3D point cloud 810 includes a model or representation of one or more of the images of the image data 808.

The system inputs 802 are provided to addition modules. The additional modules include visual odometry 812, bucket height calculation 814, and instantaneous volume measurement 816. The visual odometry module 812 can use image data, 3D data, vehicle sensor data, or any combination of these to produce a magnitude and a direction of lateral and longitudinal motion. The output can be provided to a dig cycle identification module 818 and can be used to determine whether the operator is digging the soil or moving the bucket for another purpose. The bucket height calculation 814 can include processes for outputting a bucket height to the dig cycle identification module 818. The relevant bucket can identified, which may include analyzing image data to identify pixels or points within the image that corresponds to the bucket. The bucket height can measure the separation of the bucket from the ground. The bucket height can be positive if the bucket is above the ground and it can be negative if the bucket is inside the ground or the material being moved. The ground level can be identified by analyzing the image data to identify the pixels or points representative of the ground. The bucket height at the particular point in time is provided to the dig cycle identification module 818.

The dig cycle identification module 818 can receive data and signals generated by other modules to identify the dig cycle associated with the data. The identification is provided to a valid scoop identification module 820 that can determine whether the scoop is valid.

The instantaneous volume measurement 816 can calculate a time-stamped volume measurement based on the system inputs 802. The instantaneous volume measurement, along with the scoop identification, can be provided to represent an volume estimate of contents per scoop 822 of the bucket or other container.

Figure 11:
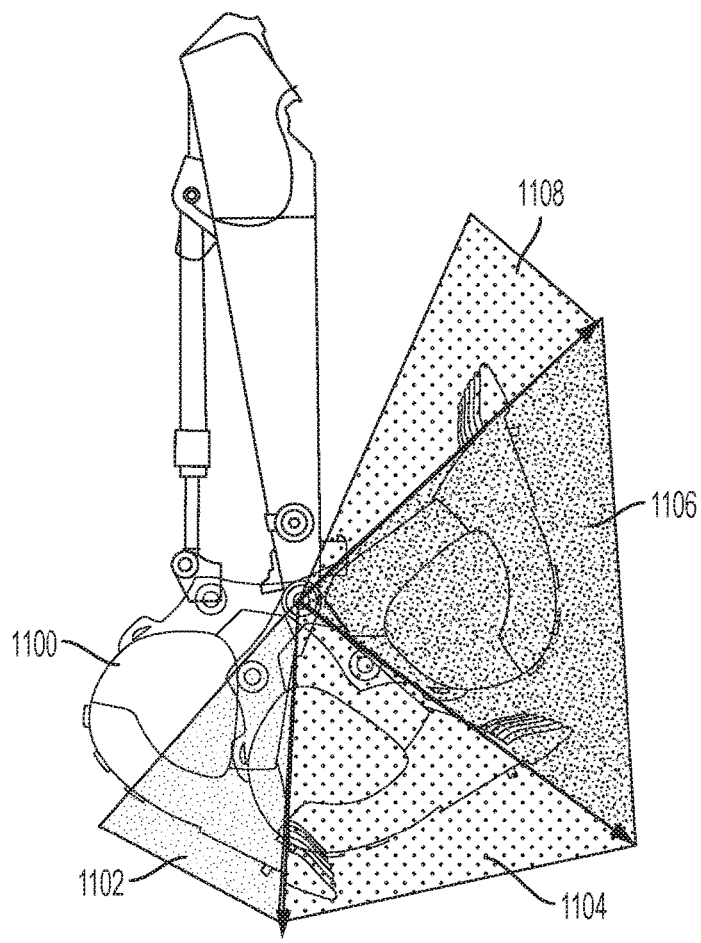
FIG. 11 is a side view of an example of a container that is rotatable through different zones according to some aspects of the present disclosure.

In some examples, as a container rotates to dig earth, the container can pass through ranges of angles, or zones. A processor device may perform different operations for determining a volume of material in the container as the container passes through each of the zones. For example, in FIG. 11, the container 1100 is rotatable through zones 1102-1108. Each zone 1102-1108 includes a range of angles at which the container 1100 can be rotated while digging earth. And as the container 1100 rotates to dig earth, the container 1100 can pass through some or all of the zones 1102-1108 shown in FIG. 11. A processor device can use an angle sensor to detect an angle of rotation of the bucket 110 and perform zero or more tasks when the processor device determines that the container 1100 is in each of the zones 1102-1108.

For example, zone 1102 can be an empty zone in which the container 1100 may not include any contents. The processor device can use the angle sensor to detect that the container 1100 is in zone 1102 and perform tasks, such as (i) updating a database to indicate a previous scoop volume, which can be a volume of material in a previous scoop of the container; (ii) updating a running total of the volume of material obtained after multiple scoops of the container; (iii) incrementing a scoop counter, which can be a counter of a number of scoops performed by the container; (iv) beginning to calculate a new scoop volume, which can be a volume of material in a current scoop of the container; or (v) any combination of these. Zone 1104 can be a "no action zone" in which the processor device may not take measurements of the interior of the container 1100 using a 3D sensor. The no action zone can include a range of angles for which there would be an insufficient amount of the interior of the container 1100 positioned within the capture field of the 3D sensor to obtain useful measurements. Zone 1106 can be a "capture zone" in which the processor device can use the 3D sensor to take measurements of the container 1100 that can be used for determining a volume of the contents in the container 1100. Zone 1106 can represent a range of angles at which the interior of the container 1100 is within a suitable capture field of the 3D sensor to enable the 3D sensor can detect the contents within the bucket 110. Zone 1108 can be another "no action zone" in which the processor device may not take measurements of the interior of the container 1100 using a 3D sensor. The processor device can identify any number and combination of zones through which the container 1100 can rotate while digging earth and perform any number and combination of tasks for each zone.

In some examples, the processor device can perform a calibration process prior to determining a volume of the contents in a container 1100. For example, the processor device can perform the calibration process when a new container 1100 is being used for the first time. The calibration process can result in calibration data corresponding to the container 1100 when the container 1100 is empty. The calibration data can serve as a baseline against which subsequent measurements of the container 1100 (e.g., when the container 1100 includes earth) can be compared. In some examples, the processor device can store the calibration data in a database for later use. The calibration process can be repeated for a variety of different containers to generate a default library of calibration data for the containers.

Figure 12:
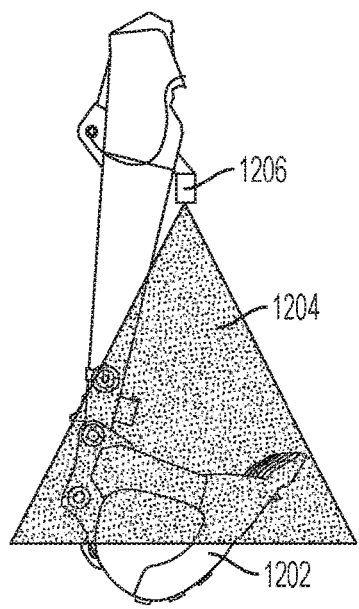
FIG. 12 is a side view of an example of a container within a field of capture of a 3D sensor according to some aspects of the present disclosure.

An example of the calibration process is described below with reference to FIGS. 12-17. FIG. 12 is a side view of an example of a container 1202 within a capture field 1204 of a 3D sensor 1206. A processor device can perform a calibration process to determine calibration data for the container 1202 using measurements taken by the 3D sensor 1206 and user input.

For example, the processor device can perform the calibration process using a rated capacity of the container 1202, a shape of the container 1202, and a strike plane of the container 1202. The rated capacity of the container 1202 can be provided as user input, and may be imprinted on a side of the container 1202, provided in a manual with the container 1202, or otherwise provided to the user by a manufacturer of the container 1202. An example of a rated capacity for the container 1202 can be 1.3 cubic meters. The shape of the container 1202 can be determined based on measurements from the 3D sensor 1206. For example, the container 1202 can be slowly curled up and down several times while the 3D sensor 1206 takes sensor measurements. A processor device can then use the sensor measurements to generate a three-dimensional (3D) representation of the shape of the bucket (e.g., using any of the techniques described above). The strike plane can also be determined based on measurements from the 3D sensor 1206. A strike plane can be a two-dimensional plane that corresponds to the top of the container 1202 and includes the four corners of the container 1202. Examples of a strike plane are shown as dashed lines in FIGS. 13-14 and shaded regions 1502 in FIGS. 15-17. In some examples, the processor device uses the sensor measurements from the 3D sensor to approximate the strike plane of the container 1202, and then a user may be able to fine tune the strike plane by via user input.

Figure 13:
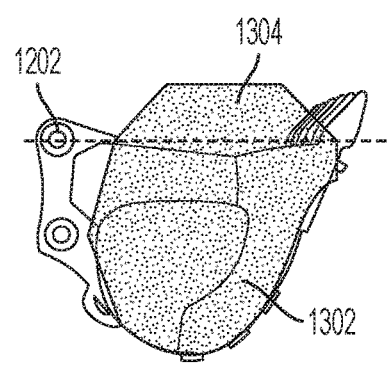
FIG. 13 is a side view of an example of a container according to some aspects of the present disclosure.
Figure 14:
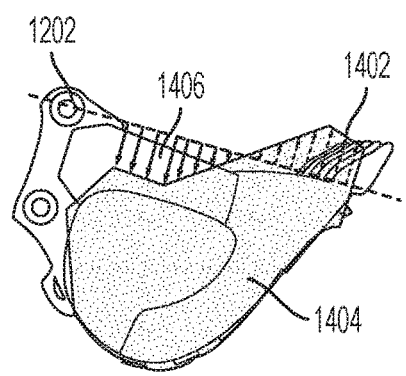
FIG. 14 is a side view of an example of a container with a scoop of material according to some aspects of the present disclosure.
Figure 15:
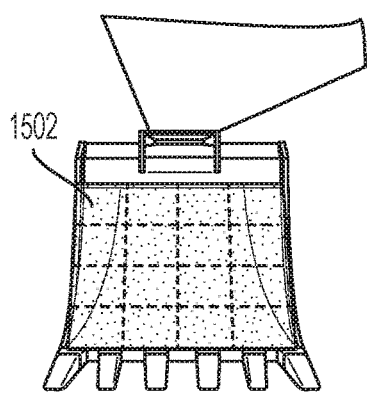
FIG. 15 is a top view of an example of a container positioned at a first angle according to some aspects of the present disclosure.
Figure 16:
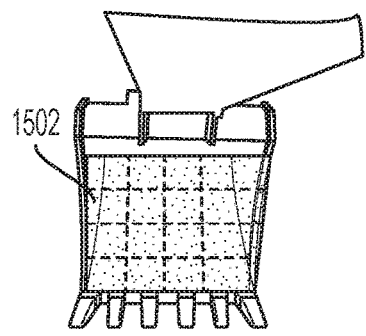
FIG. 16 is a top view of an example of a container positioned at a second angle according to some aspects of the present disclosure.
Figure 17:
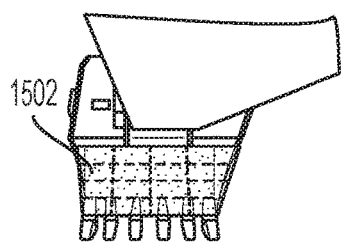
FIG. 17 is a top view of an example of a container positioned at a third angle according to some aspects of the present disclosure.

Referring now to FIG. 13, at least part of the calibration process can include determining a volume of the interior 1302 of the container 1202. The volume of the interior 1302 of the container 1202 can be determined by filling the container 1202 with earth (e.g., by scooping earth) such that a top layer 1304 of material that protrudes beyond the strike plane (e.g., represented by the dashed line). The container 1202 may be full or over capacity. A volume of the top layer 1304 of material can be determined by comparing an empty bucket grid map that has grid cells, each with a known surface area, to the images of the material in the bucket. The height of the strike plane for each grid cell can be known and have a known volume. The difference between the height can be measured and added to the known volume. The volume of the interior 1302 of the container 1202 can then be determined by subtracting the volume of the top layer 1304 from the rated capacity of the container 1202 provided by the user.

In some examples, the calibration process also includes determining a volume of a scoop of material in the container 1202. An example of a scoop of material is represented by the shaded region in FIG. 14. As shown, the scoop of material has an uneven shape, with one portion 1402 of the material being above the strike plane, another portion 1404 of the material being below the strike plane, and an empty space 1406 being between an upper surface of the other portion 1404 of the material and the strike plane. A volume of the portion 1402 of material above the strike plane can be determined by detecting the top surface of the material, determining an angle of the strike plane, and calculating a volume of the portion 1402 of the material that is above the strike plane using the detected top surface of the material and angle of the strike plane. The top surface of the material can be detected using the 3D sensor. A volume of the empty space 1406 below the strike plane can also be determined using the detected top surface of the material and the angle of the strike plane. The volume of the scoop can be determined via the following equation:

$$V\_scoop = V\_interior + V\_above - V\_empty$$

where V_scoop is the volume of the scoop, V_interior is the volume of the interior 1302 of the container 1202, V_above is the volume of the portion 1402 of the material above the strike plane, and V_empty is the volume of the empty space 1406 below the strike plane.

Figure 19:
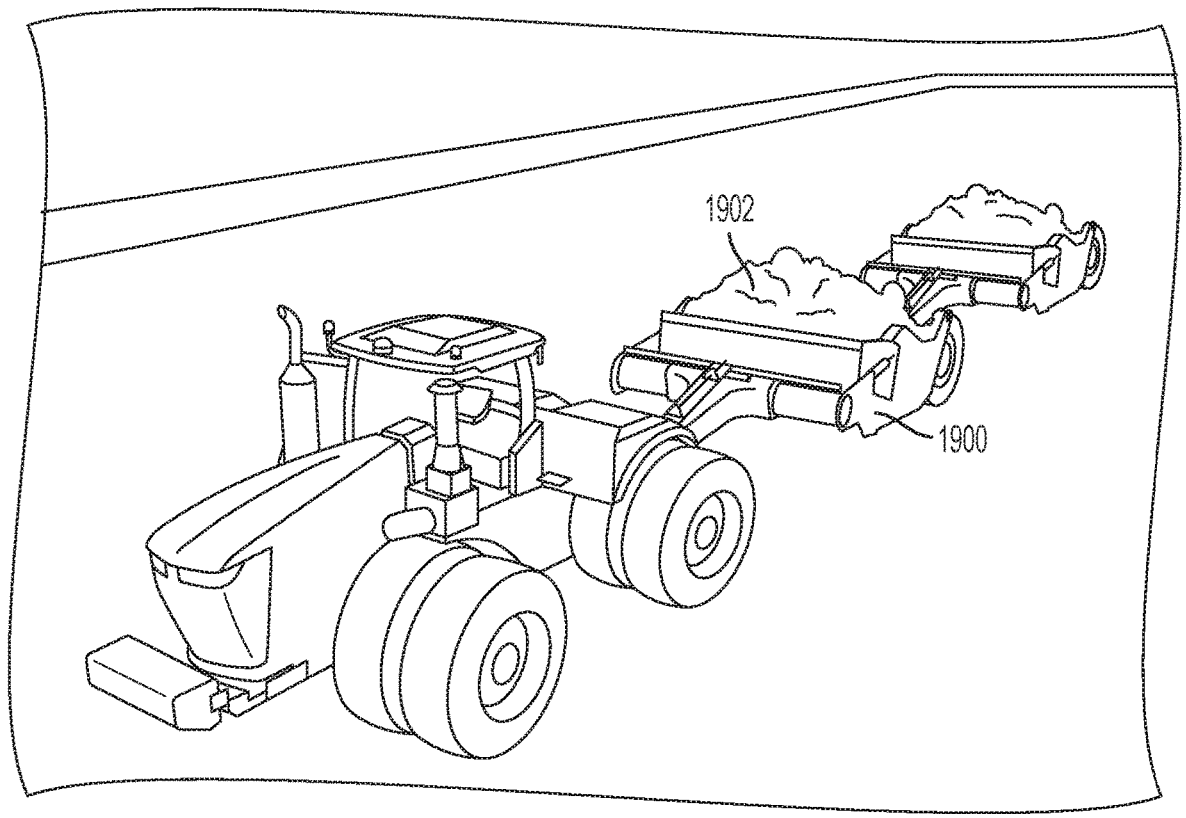
FIG. 19 is a perspective view of an example of a scraper according to some aspects of the present disclosure.

Examples of the present disclosure can be implemented using any type of work vehicle, such as an excavator or scraper. One example of a scraper 1900 is shown in FIG. 19. The scraper 1900 can be a piece of equipment used for earthmoving. The scraper 1900 can include a container 1902 and a cutting edge that can be raised or lowered. As the scraper 1900 moves along a surface, the cutting edge can scrape up earth and fill the container 1902.

Figure 20:
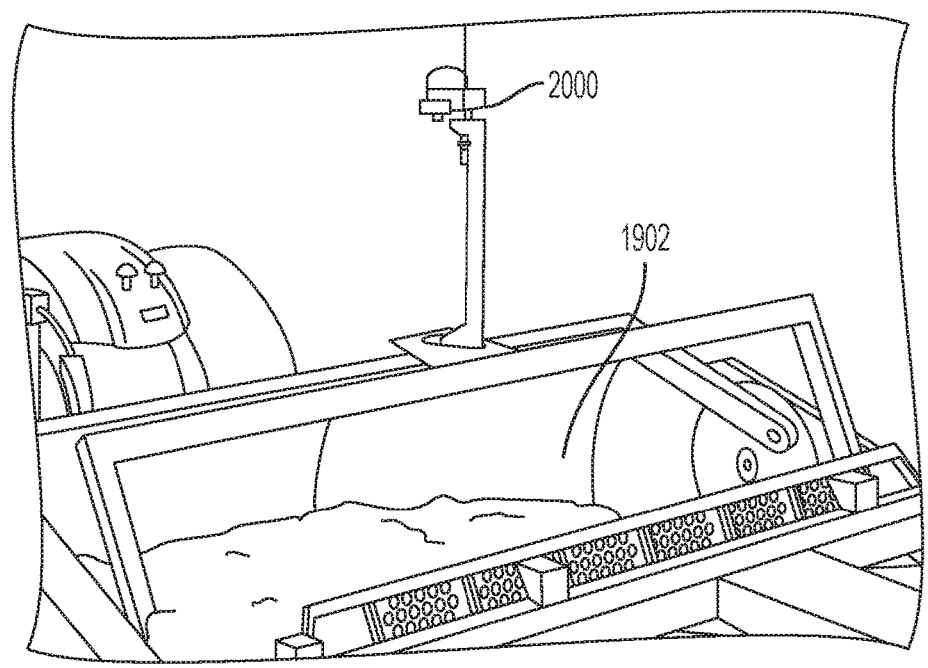
FIG. 20 is a perspective view of an example of a container of a scraper according to some aspects of the present disclosure.

One example of at least a portion of a volume estimation system 2000 coupled to the scraper 1900 is shown in FIG. 20. The volume estimation system 2000 can include a 3D sensor configured to capture material in the container 1902. The volume estimation system 2000 can use measurements from the 3D sensor to perform a calibration process for the container 1902, determine an amount of material that has accumulated in the container 1902, or both of these.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A work vehicle comprising:
   a three-dimensional (3D) sensor;
   a container having a fixed position relative to the 3D sensor;
   a cutting edge configured to scrape material from a surface into the container during a work operation, wherein the work operation involves a continuous movement of the cutting edge from a first position to a second position;
   a processor device communicatively coupled to the 3D sensor; and
   a memory device including instructions that are executable by the processor device for causing the processor device to:
   receive a plurality of images from the 3D sensor during the work operation, the plurality of images depicting the material progressively accumulating in the container of the work vehicle during the continuous movement of the cutting edge from the first position to the second position;
   based on the plurality of images, generate a plurality of 3D models during the work operation, wherein the plurality of 3D models represent the material progressively accumulating in the container during the continuous movement of the cutting edge from the first position to the second position; and
   determine a volume of the material in the container using a 3D model from among the plurality of 3D models.

2. The work vehicle of claim 1, wherein the work vehicle is a scraper, the work operation is a scraping operation, the material is earth, and a height of the cutting edge is adjustable relative to the surface.

3. The work vehicle of claim 1, wherein the 3D model is a 3D point cloud, and wherein the instructions are further executable by the processor device to determine the volume of the material in the container by comparing the 3D point cloud to a bucket model.

4. The work vehicle of claim 1, wherein the instructions are executable by the processor device to perform a calibration process prior to the work operation, the calibration process comprising:
   receiving an image of the container from the 3D sensor during the calibration process, wherein the image depicts the container when the container is empty;
   determining a three-dimensional shape of the container using the image from the 3D sensor;
   determining a reference plane of the container using the three-dimensional shape of the container; and
   determining an interior volume of the container by calculating a difference between (i) a first set of points defining an interior surface of the container and (ii) a second set of points defining the reference plane.

5. The work vehicle of claim 1, wherein the memory device further comprises instructions that are executable by the processor device for causing the processor device to:
   generate a graphical user interface (GUI) for display on a display device positioned in a cab of the work vehicle, the GUI depicting one or more 3D models among the plurality of 3D models during the work operation.

6. The work vehicle of claim 1, wherein the 3D sensor is a stereo camera.

7. A method comprising:
   receiving, by a processor device, a plurality of images from a three-dimensional (3D) sensor, the plurality of images depicting a material progressively accumulating in a container of a work vehicle during a continuous movement of a cutting edge from a first position to a second position associated with a work operation;
   based on the plurality of images, generating, by the processing device, a plurality of 3D models during the work operation, wherein the plurality of 3D models represent the material progressively accumulating in the container during the continuous movement of the cutting edge from the first position to the second position; and
   determining, by the processor device, a volume of the material in the container using a 3D model among the plurality of 3D models.

8. The method of claim 7, wherein the work vehicle is a scraper, the work operation is a scraping operation, and the material is earth.

9. The method of claim 7, wherein the container has a fixed position on the work vehicle relative to the 3D sensor.

10. The method of claim 7, wherein the 3D model is a 3D point cloud, and further comprising determining the volume of the material in the container by comparing the 3D point cloud to a bucket model.

11. The method of claim 7, further comprising performing a calibration process prior to the work operation, the calibration process comprising:
    receiving an image of the container from the 3D sensor during the calibration process, wherein the image depicts the container when the container is empty;
    determining a three-dimensional shape of the container using the image from the 3D sensor;
    determining a reference plane of the container using the three-dimensional shape of the container; and
    determining an interior volume of the container by calculating a difference between (i) a first set of points defining an interior surface of the container and (ii) a second set of points defining the reference plane.

12. The method of claim 7, further comprising generating a graphical user interface (GUI) for display on a display device positioned in a cab of the work vehicle, the GUI depicting contents of the container during the work operation.

13. The method of claim 7, wherein the 3D sensor is a stereo camera or a laser scanner.

14. A non-transitory computer-readable medium comprising program code that is executable by a processor device for causing the processor device to:
- receive a plurality of images from a three-dimensional (3D) sensor, the plurality of images depicting a material progressively accumulating in a container of a work vehicle during a continuous movement of a cutting edge from a first position to a second position associated with a work operation;
- based on the plurality of images, generate a plurality of 3D models during the work operation, wherein the plurality of 3D models represent the material progressively accumulating in the container during the continuous movement of the cutting edge from the first position to the second position; and
- determine a volume of the material in the container using a 3D model among the plurality of 3D models.

15. The non-transitory computer-readable medium of claim 14, wherein the work vehicle is a scraper, the work operation is a scraping operation, and the material is earth.

16. The non-transitory computer-readable medium of claim 14, wherein the container has a fixed position on the work vehicle relative to the 3D sensor.

17. The non-transitory computer-readable medium of claim 14, comprising program code that is executable by the processor device for causing the processor device to generate a graphical user interface (GUI) for display on a display device positioned in a cab of the work vehicle, the GUI depicting contents of the container during the work operation.

* * * * *